United States Patent [19]

Stricker

[11] 4,242,709
[45] Dec. 30, 1980

[54] STRIP MEDIA DRIVE SYSTEM

[76] Inventor: Klaus F. Stricker, 447-1 Fairview Ave., Arcadia, Calif. 91006

[21] Appl. No.: 7,361

[22] Filed: Jan. 29, 1979

[51] Int. Cl.³ .................. G11B 15/32; G11B 15/43; G11B 23/04
[52] U.S. Cl. .................. 360/96.4; 226/182; 242/75; 242/192; 242/206; 360/90
[58] Field of Search .................. 360/96.4, 96.3, 90, 360/83, 74.3, 71, 73; 242/75–75.3, 151, 153, 155 R, 65, 192, 206, 208, 209–210; 226/193, 192, 182, 186

[56] References Cited

U.S. PATENT DOCUMENTS

| 2,655,325 | 10/1953 | Kuettler, Jr. et al. | 242/151 |
|---|---|---|---|
| 2,658,398 | 11/1953 | Masterson | 360/90 |
| 2,743,878 | 5/1956 | Masterson | 360/90 |
| 3,035,186 | 2/1967 | Burorf et al. | 242/192 |
| 3,114,512 | 12/1963 | Peshel et al. | 360/90 |
| 3,125,311 | 3/1964 | Willis | 242/192 |
| 3,154,308 | 10/1964 | Faulkner | 360/96.1 |
| 3,297,268 | 1/1967 | Sawazaki | 242/192 |
| 3,467,338 | 9/1969 | Breuer | 242/192 |
| 3,514,049 | 5/1970 | Decker et al. | 242/192 |
| 3,620,473 | 11/1971 | Stone | 242/192 |
| 3,692,255 | 9/1972 | Von Behren | 242/192 |
| 3,907,230 | 9/1975 | Merle et al. | 242/192 |
| 4,017,904 | 4/1977 | Tsukamoto et al. | 360/90 |
| 4,018,402 | 4/1977 | Burdorf | 242/192 |
| 4,028,912 | 6/1977 | Schneck | 242/75 |
| 4,049,216 | 9/1977 | Burdorf et al. | 242/206 |
| 4,123,789 | 10/1978 | Shatausky | 242/192 |
| 4,159,811 | 7/1979 | Grant | 242/192 |

OTHER PUBLICATIONS

IEE Transactions on Magnetics, vol. MAG-14, No. 4, Jul. 1978, pp. 171-175.

Primary Examiner—Alfred H. Eddleman
Attorney, Agent, or Firm—Christie, Parker & Hale

[57] ABSTRACT

A strip media drive system has a pair of rotatable strip media packs for reeling the strip media therebetween. An endless belt couples the rotation of the media packs together. A belt tensioner creates a greater tension in a portion of the endless belt leaving than in the portion entering the belt tensioner. The belt tensioner includes at least first and second rotatable rollers. The first roller has a hard outer periphery and the second roller has a viscoelastic outer periphery. The first and second rollers are forced together on opposite sides of the endless belt so that as the belt is drawn therebetween, rolling friction between the rollers creates the higher tension in the portion of the belt leaving the tensioner.

55 Claims, 11 Drawing Figures

STRIP MEDIA DRIVE SYSTEM

BACKGROUND OF THE INVENTION

This invention relates to strip media drive systems and more particularly to strip media drive systems having a pair of belt coupled strip media packs for reeling the strip media therebetween. Of particular interest is a belt coupled strip media drive embodied in a magnetic tape cartridge.

The basic principle of operation for magnetic tape drive systems, cartridge or non cartridge, that utilize thin, flexible, endless peripheral belts to transfer the tape from one reel to another under tension, is the two pulley, flat belt drive. In such a belt drive one pulley is the "driver" and the other is the "driven" pulley or the "load".

In such a system there exists a slack (low tension) and a taut (high tension) side of the endless belt, the taut side always being "downstream" of the driven pulley in the direction of motion of the belt and between the driver and driven pulley. Since any elastic material stretches under tension, the taut side of the endless belt is thinner than the slack side and since such belt drives are always endless closed loop systems, continuity of mass flow must exist by the laws of physics. This means that at any point in the belt drive, an equal amount of belt mass must pass per unit time. This then requires that the velocity of the belt on the tauter (thinner) side of a belt drive must be greater than the velocity of the belt on the slacker (thicker) side by an amount proportional to the difference in thickness.

Magnetic tape cartridges have been produced in varying configurations and in a wide range of capabilities for application in audio, analog and digital recording. Early tape cartridge designs utilized capstans with pinch rollers for moving the tape and various configurations of slip clutches or brakes as part of the reel drives to create tape tension. Since application of Coulomb friction in any mechanical system results in high energy losses and poor controllability, the early cartridge left much to be desired in terms of speed accuracy and uniformity for analog recording applications. Also, because of the energy inefficiency, rapid acceleration and deceleration for digital computer applications was not feasible.

Belt driven magnetic tape transports and cartridges are known in which a peripheral endless flexible belt contacts a reel pack (tape wound on rotatably mounted reel hub) in such a manner that motion induced into the belt by external rotating power sources causes a transfer of tape from one reel pack to another. Such devices are described in the IEE transactions on Magnetics, Vol. MAG-14 No. 4, July 1978, pp. 171-175 entitled "An Improved ANSI-Compatible Magnetic Tape Cartridge" by Newell; U.S. Pat. Nos. 2,658,398; 2,743,878; 3,114,512; 3,125,311; 3,154,308; 3,297,268; 3,305,186; 3,467,338; 3,514,049; 3,620,473; 3,692,255 and 3,907,230 and French Pat. Nos. 2,212,981; 2,220,841 and 2,260,165.

In the above mentioned belt driven tape transports and cartridges the belt is preferably separated from the magnetic tape as the tape passes across the magnetic record and reproduce heads to minimize tape motion disturbances due to the differences in elasticity between the belt and the tape. Tension in the magnetic tape is created by causing the belt on the takeup side of the drive to move at a slightly higher velocity than on the supply side as described above. This is accomplished by means of dual differential capstans or braking devices in the belt path.

The peripheral belt driven cartridges described in the prior art do possess the capability of bidirectional tape motion under tension and are completely removable from the tape transport as self contained devices. However, due to the very low modulus of elasticity of the elastomer belts used on some cartridges, which is required to create tape tension, the resonant frequencies of the belt-tape systems are so low as to severely limit the acceleration and deceleration rates or start-stop times of the cartridge tape drive systems. High acceleration and deceleration rates are of vital importance to modern high speed computer tape drives. Rapid acceleration of the tape in prior art cartridges can also result in excessive and harmful tensile stresses in the tape substrate. In addition, the elastic characteristics of the belts do not allow the close control of instantaneous speed variations that is essential for high frequency, precision analog recording and high flux reversal density, high speed digital recording for computer applications.

The prior art generally teaches the construction of peripheral belt driven tape cartridges that require the use of elastomer belts with very low modulii of elasticity and the prior art does not provide for any means for precisely adjusting the effective tape tension after complete cartridge assembly. In the prior art the effective tape tension is invariable after assembly of the device and is dependent on the physical and elastic characteristics of the materials used and the variation in dimensional sizes of the cartridge components due to manufacturing tolerances.

The major means, then, employed in the prior art for creating the difference in tension in the endless belt have been mechanical braking devices, differential dual capstans, Coulomb friction, or the squeezing of a thick rubber belt. A disadvantage of these prior art devices other than the one employing braking means is that no adjustment of the effective tape tension is possible after assembly of the components. The final tension is determined by the manufacturing tolerances of the individual parts and the elastic characteristics and variations of the belt material. The disadvantages of the prior art devices employing mechanical braking means include low reliability and non-uniformity of tension due to uncontrollable and often instantaneous variation of the frictional characteristics of the materials used and the considerable variation of the frictional characteristics with temperature and usage.

SUMMARY OF THE INVENTION

Briefly, an embodiment of the present invention is a strip media drive system. A pair of rotatable strip media packs reel the strip media therebetween. An endless belt couples the rotation of the packs together without slippage between belt and strip media, and a belt tensioner creates a greater tension in the portion of the endless belt leaving than in the portion entering the belt tensioner. The belt tensioner comprises at least first and second rotatable rollers. The first roller comprises a hard outer periphery and the second roller comprises a viscoelastic outer periphery. The first and second rollers are forced together on opposite sides of the endless belt so that as the belt is drawn therebetween, rolling friction between the rollers creates higher tension in the portion of the belt leaving the tensioner.

With the embodiment of the present invention it is now possible to provide a mechanically simple and reliable tape tension mechanism which overcomes the disadvantages and limitations of the prior art devices.

With an embodiment of the present invention it is also possible to provide means and mechanism to precisely adjust the final effective tape tension after assembly of the strip media drive, thereby allowing compensation for component tolerances and variations of elastic characteristics of the endless belt and other component materials. An embodiment of the present invention also allows for use of high tensile modulus of elasticity endless belts. As a result the drive system may be employed in magnetic tape cartridges for high speed, high density digital recording applications such as for computers.

Additionally the embodiment of the invention allows a mechanism for magnetic tape cartridges where low flutter or precision analog recording is required with reliable performance over a wide temperature range and severe environmental conditions.

The embodiment of the present invention also allows for versatility to suit the specific needs of individual applications.

DETAILED DESCRIPTION

Figure 1:
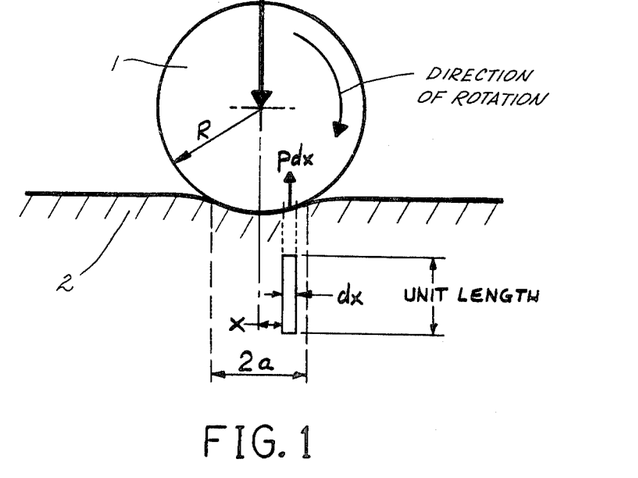
FIG. 1 is a diagrammatic illustration of the basic phenomena of rolling friction.

Referring to the drawings, FIG. 1 shows a hard cylinder rolling on a flat elastomeric surface. Based on substantial scientific investigation and experimental as well as analytical analysis, the physical principles of what is technologically known as "rolling friction" are mathematically well defined and empirically verified. Scientific investigation has shown that the energy losses occurring when a hard cylinder is made to roll under load on an elastomer surface are mainly due to elastic hysteresis losses in the elastomer material. The magnitude of the rolling friction is dependent on the load or amount of deformation of the elastomer material, the diameter of the hard cylinder, and the elastic characteristics of the elastomer.

It has been shown that when a hard cylinder rolls over a plane elastomer surface, the elastomer in the front portion of the circle segment of contact is compressed such that elastic work is done on it. The elastomer in the rear portion of the circle of contact recovers elastically and urges the cylinder forward. If the elastomer were an ideally elastic material, the energy restored as the elastomer recovered would be exactly equal to the energy expended for compression of the elastomer in the front portion of the contact region such that no net force would be required to roll the cylinder. In practice, however, all elastomers behave as viscoelastic materials and dissipate energy, when they are deformed, by internal friction or hysteresis. It is this loss in energy during the recovery of the elastomer material that is reflected in the work required to roll the cylinder along. If one considers a cylinder 1 of radius R subjected to a load W per unit length of the cylinder and let the chord of contact with an elastomeric substrate 2 be $2a$, then according to previous analysis by Hertz (1881) the pressure at a point, a distance X from the center of contact, is given by Equation A.

If the cylinder moves forward a very small distance $\delta$ then the work done by the pressure over a strip of width dx will be pdx $(x\delta/R)$ and the total work done by the front half of the cylinder will be given by Equation AA.

Hence the work done per unit distance of motion of the cylinder is given by Equation B.

Further analysis by Hertz shows that Equation BB applies when E = Young's modulus of elasticity and $\gamma$ = Poisson's ratio.

Substituting this value for "a" into the equation for the work done per unit length results in Equation C.

Figure 2:
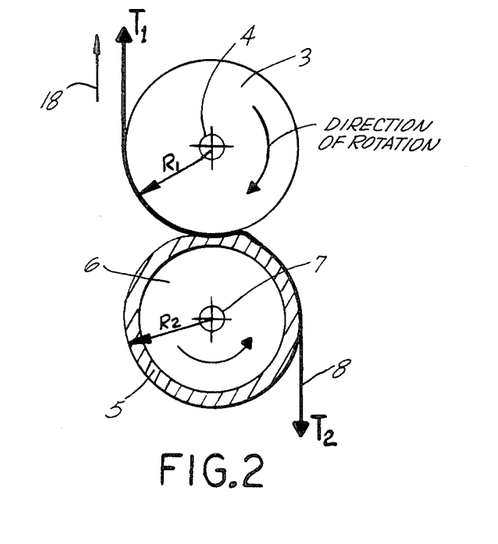
FIG. 2 is a schematic diagram depicting one type of the tensioning mechanism employed in one embodiment of the present invention.

FIG. 2 depicts a tape tensioning mechanism for use in the present invention utilizing the phenomena of rolling friction for implementation in a reeling mechanism for tape or strip media such as a two reel tape recorder or tape cartridge. In this diagram a hard cylinder or roller 3 is rotatably mounted ideally with a frictionless bearing on a pin 4. The pin mounted roller 3 is forced into contact with a second roller designated 6 having a thick ring of elastomer 5 bonded to its outer perimeter and also rotatably mounted ideally with a frictionless bearing on a fixed pin 7. The hard cylinder 3 is forcibly pressed into the elastomer ring 5 to effect a certain amount of deflection of the elastomer and a thin endless flexible belt 8 is placed between the two rollers and pretensioned by a tensile force $T_2$. As a result the tensile force $T_1$ required to rotate both cylinders 3 and 6 in the direction indicated by the arrows and to move the belt in the direction indicated by arrow 18 is larger than $T_2$ by an amount proportional to the amount of deflection of the elastomer ring 5. The pin 4 is movable or adjustable so that the pressure between cylinders 3 and 6 can be selected and adjusted for the required amount of tensioning. The manner in which the pin 4 and hence cylinder 3 are adjusted is described with reference to FIGS. 9-11. The magnitude of $T_1$ can be calculated exactly by using Equation C. This embodiment operates bidirectionally; however, the diameters of cylinders 3 and 6 indicated by $R_1$ and $R_2$ must be equal in order for $T_2$ to be of the same magnitude after direction of motion reversal as $T_1$ was before reversal.

Figure 3:
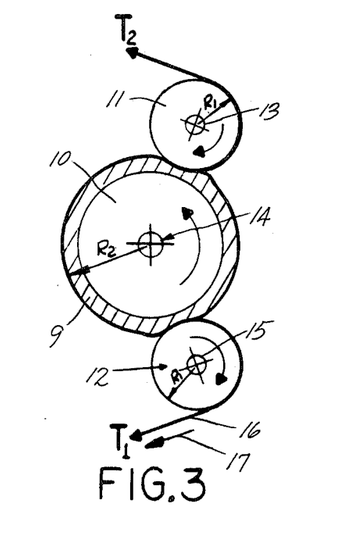
FIG. 3 is a schematic diagram depicting a preferred tensioning mechanism for use in a preferred embodiment of the present invention.

FIG. 3 shows a preferred tape tensioning mechanism for use in the present invention. With this arrangement a central roller 10 having a thick elastomer ring 9 bonded to it is rotatably mounted ideally with a frictionless bearing on a fixed pin 14. In this embodiment, two hard cylinders or rollers 11 and 12 of equal diameter, indicated by the radius $R_1$, are each rotatably mounted ideally with frictionless bearings on movable or adjustable pins 13 and 15 (adjustable as described for pin 4 of FIG. 2), respectively. The cylinders 11 and 12 are located symmetrically about the central roller 10 as shown. Each hard roller 11 and 12 is mounted such that it can be forced individually into the elastomer ring 9 of roller 10. A thin endless flexible belt 16 is placed between the two hard rollers 11 and 12 and the elastomer ring 9 of central roller 10 and pretensioned by a tensile force $T_2$. The tensile force $T_1$ required to rotate all three rollers in the direction shown and to move the belt in the direction of motion indicated by arrow 17 is larger than $T_2$ by an amount proportional to the amount of deflection of the elastomer 9 at the point of contact with the hard rollers 11 and 12. The magnitude of force $T_1$ to move the belt 16 can again be calculated exactly by using Equation C. This embodiment also operates bidirectionally. The advantage of this embodiment over that shown in FIG. 2 is that the diameter $R_1$ of the hard rollers 11 and 12 and the diameter $R_2$ of the central roller 10 can be individually optimized for best performance. However, the diameters of the hard rollers 11 and 12 must be equal in order for the magnitude of force $T_2$ to be of the same magnitude after direction of motion reversal as $T_1$ was before reversal.

Figure 4:
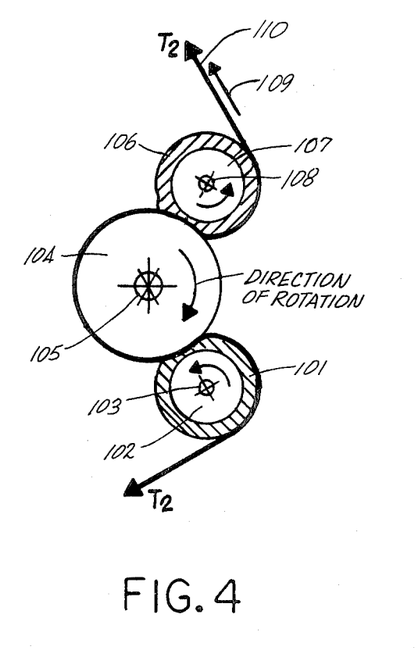
FIG. 4 is a schematic diagram of an alternate preferred tensioning mechanism for use in an alternate preferred embodiment of the present invention.

FIG. 4 shows another tensioning mechanism for use according to the present invention though it is less desirable than the one shown in FIG. 3. With this arrangement a hard cylindrical roller 104 is centrally located and rotatably mounted ideally with a frictionless bearing on a fixed pin 105. Two cylindrical rollers 102 and 107 are located symmetrically about the central roller 104 as shown. The two cylindrical rollers 102 and 107 have thick elastomer rings 101 and 106, respectively, bonded thereto. The outside diameters of elastomer rings 101 and 106 must be equal, and each roller 102 and 107 is rotatably mounted, ideally with frictionless bearings on movable or adjustable pins 103 and 108 (adjustable as described for pin 4 of FIG. 2), respectively. Each elastomer ringed roller 102 and 107 is mounted such that it can be forced individually into the hard roller 104. Again, a thin endless flexible belt 110 is placed between the hard roller 104 and the elastomer ringed rollers 102 and 107 and pretensioned by a tensile force $T_2$. In this embodiment too the tensile force $T_1$ required to rotate all three rollers in the directions shown and to move the belt 110 in the direction indicated by arrow 109 is larger than $T_2$ by an amount proportional to the deflection of the elastomer rings 101 and 106 at their respective points of contact with the hard roller 104. The magnitude of $T_1$ can also be exactly calculated by using Equation C.

This embodiment also operates bidirectionally; however, having the belt in contact with the elastomer rings of rollers 102 and 107 may produce undesirable instantaneous variations in the tension force $T_1$.

Figure 5:
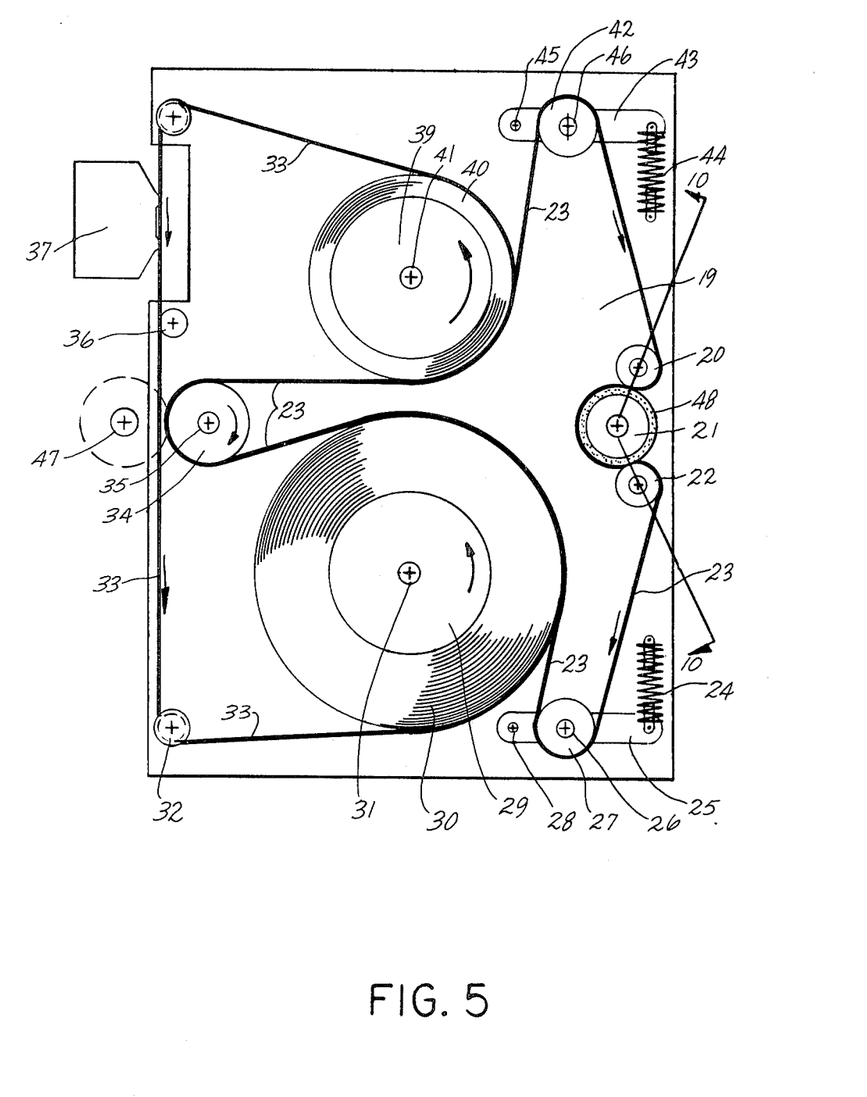
FIG. 5 is a schematic plan view of a magnetic tape drive cartridge for high speed, high density digital recording applications and embodying the present invention; the housing is removed to reveal the internal parts of the cartridge.

FIG. 5 is a tape cartridge for application primarily in high speed high density digital cartridge tape recorders for computer applications and embodying the present invention. In this embodiment a common base plate 19, forming the lower part of a housing for the cartridge, secures all components. An endless thin flexible belt 23 is routed through the tensioning mechanism 20,21,22 as described in connection with FIG. 3 and is guided by belt idlers 27 and 42 which ideally are mounted on frictionless bearings and drive capstan 34 also mounted ideally on frictionless bearings to make contact with the magnetic reel packs 30 and 40 over an arc of not less than 75°. The belt is uniform in cross-section and elastic modulus throughout its length and is preferably coated with a thin layer of a high coefficient of friction polymer to effect a non-slipping interface with the reel packs 30 and 40 and the drive capstan 34. The belt material preferably has a minimum modulus of elasticity of 400,000 psi.

The two belt idlers 27 and 42 are mounted through pins 26 and 46 to brackets 25 and 53 which are pivoted around pins 28 and 45. The brackets 25 and 43 are pivoted at 28 and 45 to the base plate 19 in such a manner that they rotate idlers 27 and 42 upon urging by compression springs 24 and 44 in directions that will pretension the belt.

The forces exerted by compression springs 24 and 44 on brackets 25 and 43 are calculated to be of a magnitude that will create an initial tension in the belt which is high enough to prevent slippage between the belt 23 and the reel packs 30 and 40 and the drive capstan 34 under worst-case acceleration and inertial conditions. This spring-loaded mounting method of belt idlers 27 and 42 also compensates for changes in the minimum required belt length as the tape is transferred from one reel to the other, without loss of effective pretension in the belt.

Reel hubs 29 and 39 on which the magnetic tape is would are mounted ideally with frictionless bearings on pins 31 and 41 which are securely fastened to the base plate 19. Tape 33 is convolutely wound on the reel hubs 29 and 39 in opposite directions so as to allow transfer of the tape from one reel hub to the other under tension. A tape guide path is defined by three tape guides 32,36 and 38 between the two reel hubs such that the tape is brought into contact with a magnetic read/write head assembly 37 and prevented from making contact with the drive capstan 34. The drive capstan 34 is rotated in a clockwise manner as indicated in FIG. 5 by the external motor capstan 47 causing the belt 23 to traverse its guided path also in a clockwise manner as indicated by the arrows. This belt motion, by means of non-slipping contact with the outer layer of tape on tape packs 30 and 40 causes the tape to transfer from reel hub 39, the supply reel for this direction of tape motion, to reel hub 29, the take-up reel.

The precisely adjusted elastic deformation of the elastomer ring 48 of the central roller 21 at the point of contact with hard rollers 20 and 22 as described with reference to FIG. 3 requires a higher tension in the belt contacting the tape on the take-up reel pack 30 in order to pull the belt through the tensioning mechanism than the tension in the belt contacting the tape on the supply reel pack 40. This increased tension in the belt portion on the take-up side causes the belt to travel faster on this side than the belt on the supply side, to preserve the continuity of mass flow. This increased speed of the belt on the take-up side causes tension in the tape when the tape is taut and also gives the mechanism the ability to remove any slack in the tape that might develop between the supply and take-up packs, when no slippage occurs between tape and belt.

Figure 9:
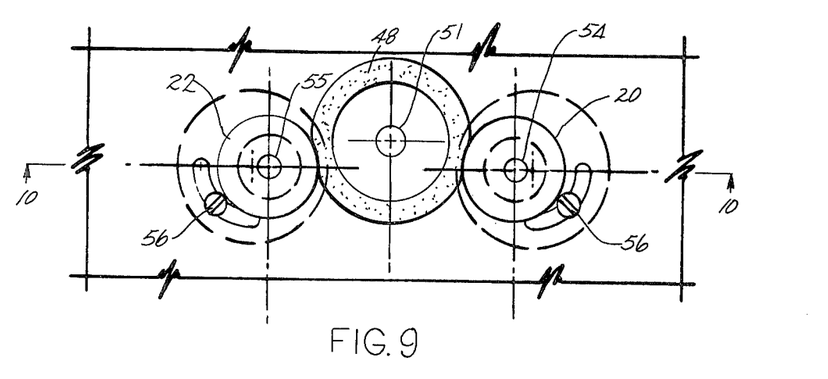
FIG. 9 is an enlarged top plan view of the tensioning mechanism depicted in FIG. 5 showing the mechanism for achieving precision adjustment of the effective tape tension.
Figure 10:
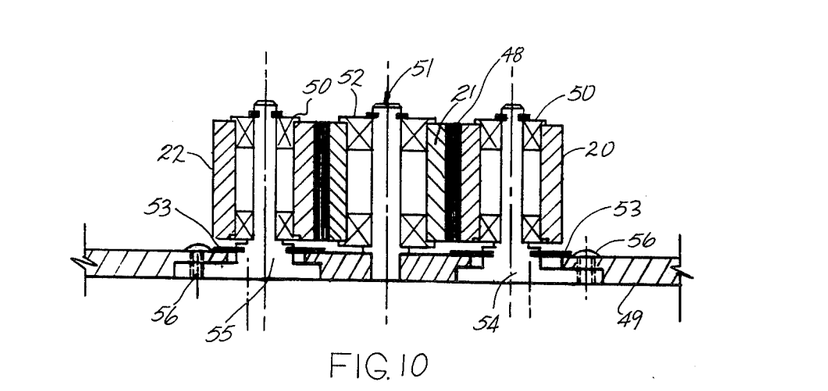
FIG. 10 is a section view of the tensioning mechanism of FIG. 9 taken along the lines 10—10 of FIG. 9.
Figure 11:
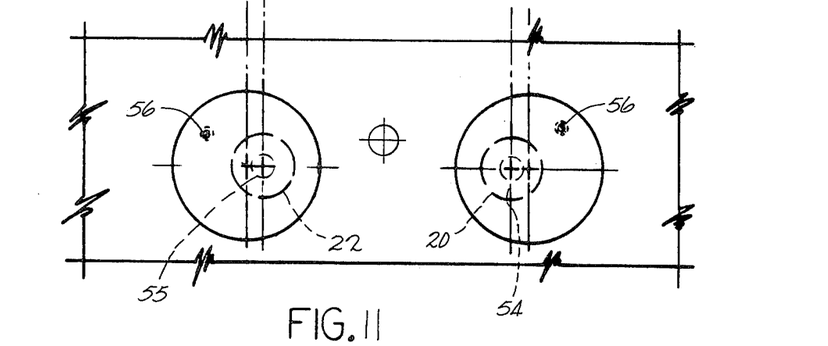
FIG. 11 is a bottom view of the tape tensioning mechanism looking through the housing.

Refer now to the roller adjusting means depicted in FIGS. 9–11. This arrangement allows precision adjustment of the effective tape tension in the cartridge after the cartridge is completely assembled. The central roller 21 with a thick elastomer ring 48 bonded to it is mounted with ideally frictionless ball bearings 52 on a fixed shaft 51. The shaft 51 is securely fastened to the base plate 19. Both of the hard cylindrical rollers 20 and 22 are mounted with ideally frictionless ball bearings 50 on eccentrically located shafts 54 and 55, respectively. The eccentric mounting of the shafts allows for precision adjustment of the elastic deformation of the elastomer ring 48 to yield and maintain the exact amount of tape tension desired. The eccentric shafts are rotatably secured to the base plate 19 by means of retaining rings 53 or similar securing devices. After adjustment the eccentric shafts are secured non-rotatably to the base plate by machine screws 56.

Figure 6:
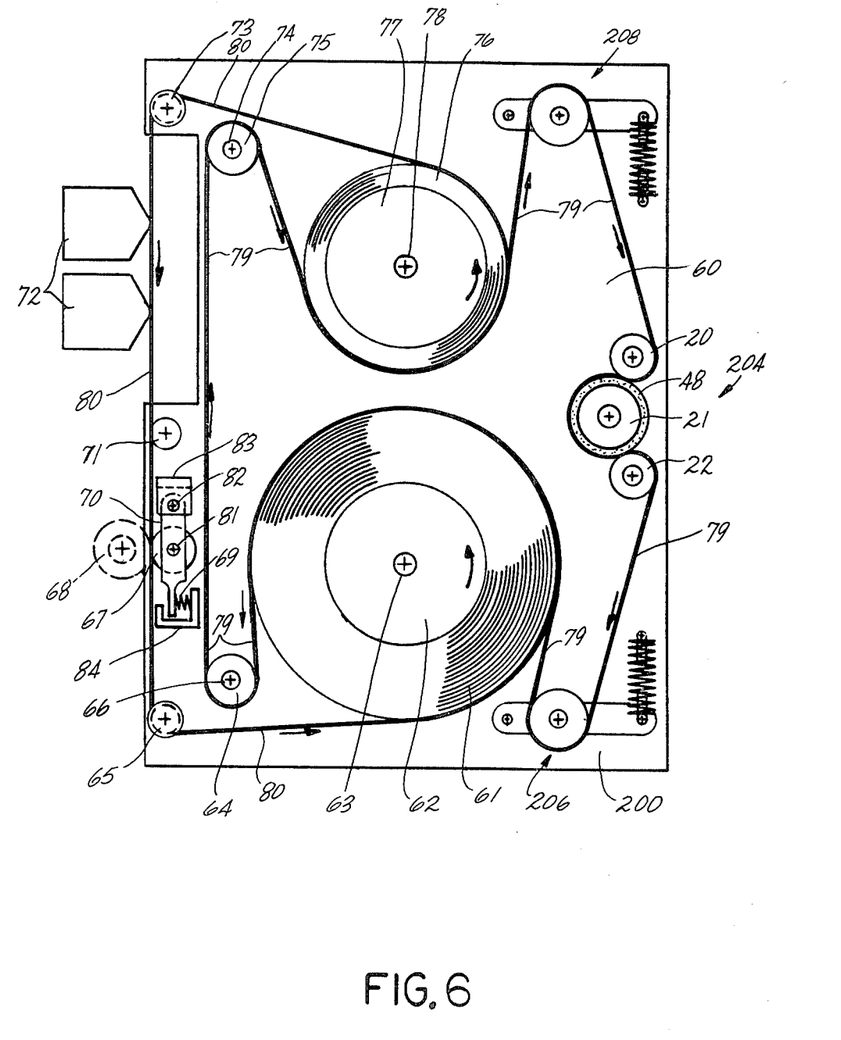
FIG. 6 is a schematic plan view of a magnetic tape cartridge for use in analog and precision audio recording applications and embodying the present invention; the housing is removed to reveal the internal parts of the cartridge.

Refer now to the embodiment of the invention depicted in FIG. 6. This embodiment is a tape cartridge primarily designed for utilization in low-flutter analog and precision audio recording applications. In this embodiment all components again are secured to a common base plate 200. Three rollers are depicted at 204 and are essentially the same as rollers 20,21 and 22 making up the tensioning mechanism of FIG. 5. Belt pretensioning elements 206 are essentially the same as elements 24–28 of FIG. 5 and belt pretension elements 208 are essentially the same as elements 42–46 of FIG. 5. The major difference in this embodiment over that of FIG. 5 is that a single external drive motor capstan 68 makes direct contact with magnetic tape 80 thereby functioning as the direct means to move tape 80 from supply reel 77 to take-up reel 62. The belt 79 in this embodiment is a passive component and functions only to establish tape tension. Instead of being routed around a drive capstan as in FIG. 5, the belt 79 is routed around two belt idlers 64 and 75 each mounted with ideally frictionless bearings on fixed pins 66 and 74. This routing of the belt 79 provides for a greatly increased minimum angle of wrap or contact of the belt 79 with the reel packs 61 and 76 of not less than 135°. This increased angle of contact with the reel packs requires a much lower value of initial tension in the belt by the tensioning elements 206 and 208. This in turn allows very smooth rotational motion of all rotating components and provides the basis for the low flutter performance required for precision analog and highest quality audio recording.

The tape 80 is guided between the supply reel pack 76 and the take-up reel pack 61 by at least three low friction tape guides 65, 71 and 73. The external single motor capstan 68 makes direct contact with the magnetic tape 80 to effect very precise speed control essential for low-flutter precision recording. The required non-slipping friction interface between motor capstan 68 and tape 80 is accomplished with the assistance of the spring force biased pinch roller 67 securely clamping the tape between the two. As shown in FIG. 6 this is preferably accomplished by rotatably mounting the pinch roller 67 on a pin 81 which is securely fastened to a bracket 70. The bracket 70 is pivotally mounted with a pin 82 to a bracket 83 such that it can be forcibly engaged with the external motor capstan 68 by a compression spring 69. A bracket 84 is C-shaped and functions as a support for mounting the spring 68 and as a retainer for the pinch roller mounting bracket 70 when the pinch roller 67 is not engaged with the motor capstan 68.

Access for contact between the magnetic tape 80 and the record and reproduce heads 72 is provided between two low friction tape guides 71 and 73.

Figure 7:
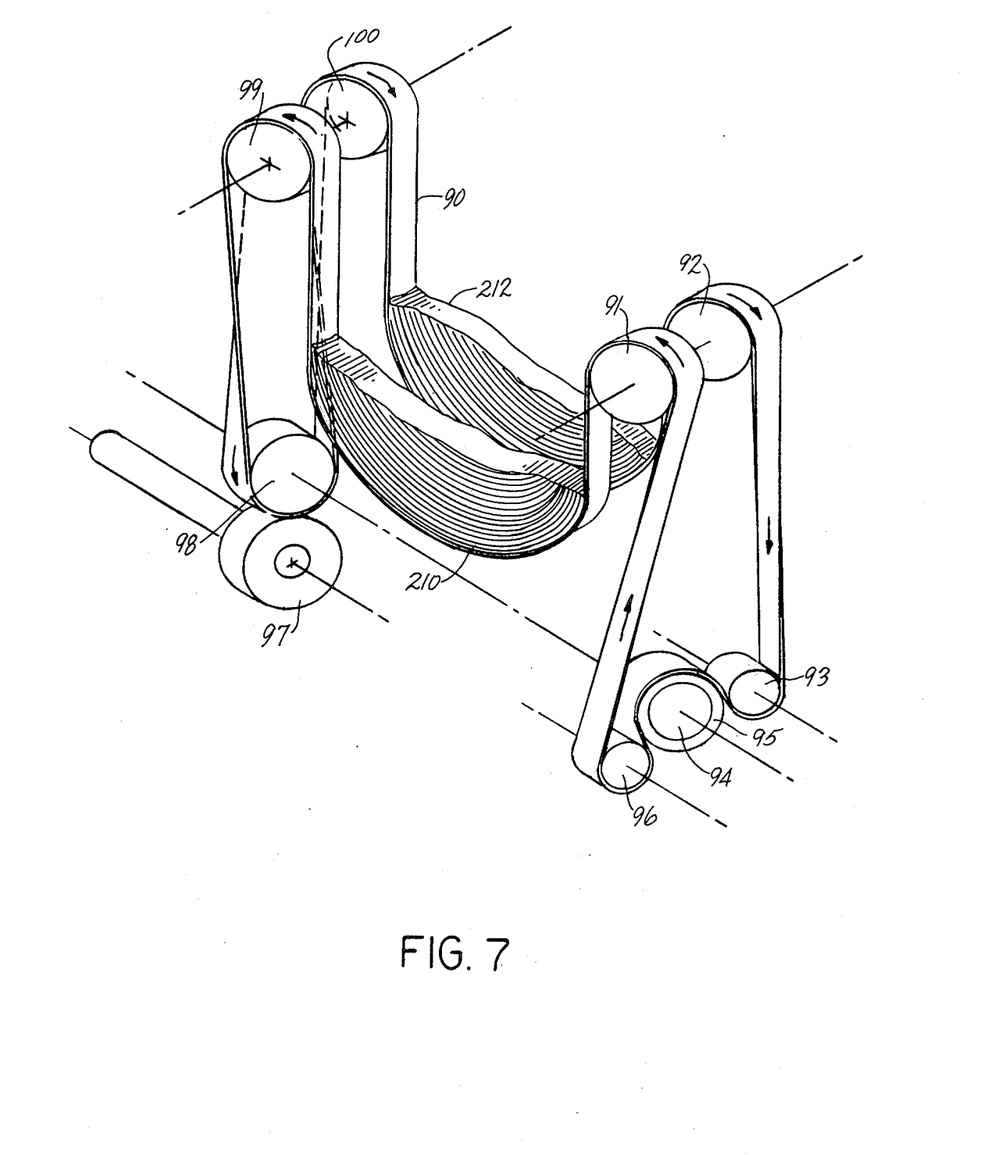
FIG. 7 is a schematic isometric view of a further magnetic tape cartridge or tape transport with coaxial reels for digital or audio recording and embodying the present invention.

Refer now to FIG. 7 which depicts a tape transport or a tape cartridge where supply and take-up tape reel packs 202 and 204 are arranged in a coaxial configuration. This embodiment is most suitable for digital recording applications. In this embodiment an endless belt 90 is guided in a closed loop path such that it will make non-slipping contact with the supply reel pack 12 between belt guide idlers 100 and 92. Leaving belt idler 92, the belt is routed through the tensioning mechanism elements 93,94,95 and 96 such that the belt 90 is in a non-slipping contact with the take-up reel pack 210 between the belt idlers 91 and 99. The elements 93 and 96 are hard rollers similar to 20 and 22 of FIG. 5. Element 94 is a central roller and element 95 is an elastomer ring similar to 21 and 48, respectively, in FIG. 5. Pressure is applied between rollers 93 and 96 and the elastomer ring 95 as described with reference to FIG. 5. Since, by the previously explained principles, the belt 90 is moving at a higher velocity between the idler 96 of the tensioning mechanism and the drive roller 98 than the portion of the belt between drive roller 98 and roller 93 of the tensioning mechanism, which is in non-slipping contact with the supply reel pack 212, an effective and precisely adjustable tape tension is also created in this embodiment. For clarity, the actual reel packs 210 and 212 have been partially broken away in FIG. 7. The cartridge belt capstan 98 provides a non-slipping contact between belt and external motor capstan 97 in a similar manner to that described with reference to FIG. 5.

Figure 8:
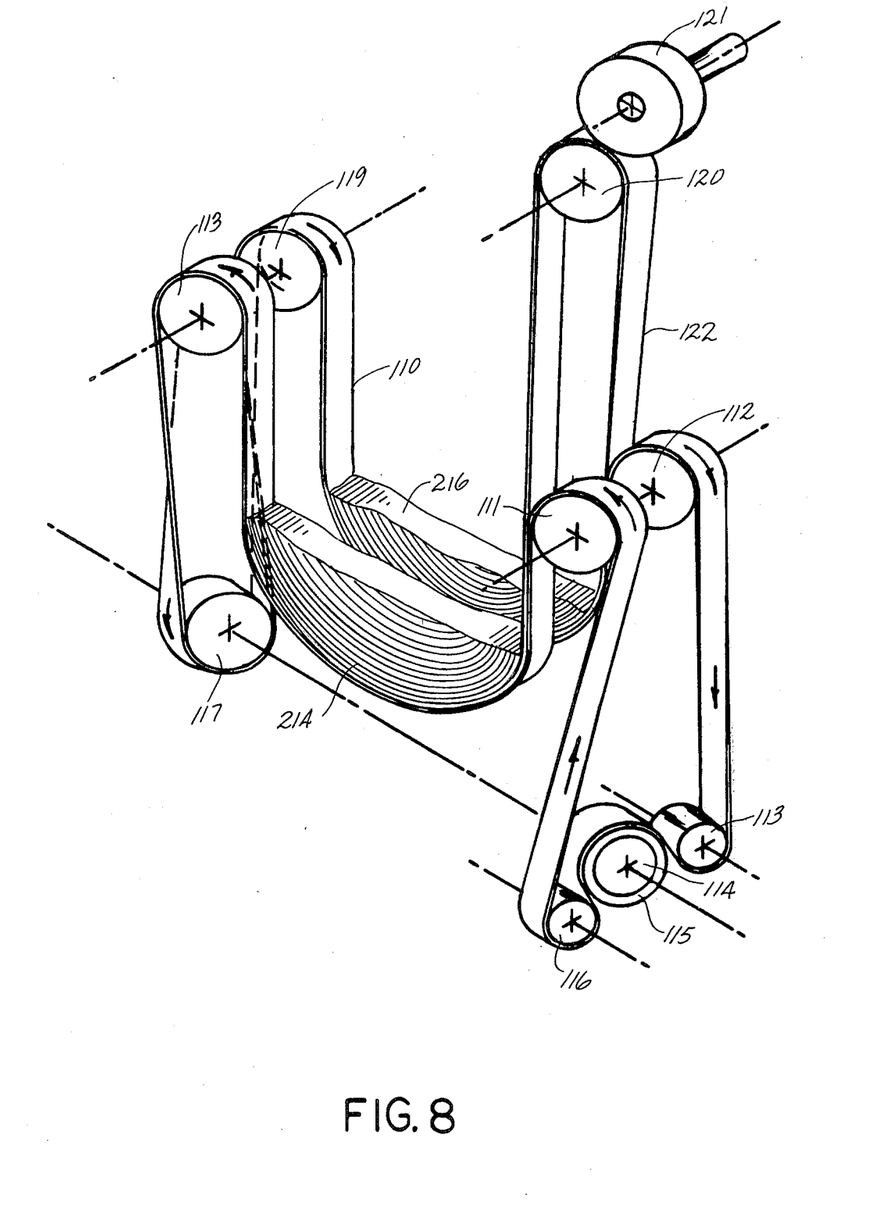
FIG. 8 is a schematic and isometric view of a still even further magnetic tape cartridge or tape transport with coaxial reels for precision analog recording and embodying the present invention.

FIG. 8 depicts still another embodiment of the invention wherein the tape tensioning mechanism is incorporated into a tape transport or a tape cartridge with supply and take-up reel packs 216 and 214 arranged in a coaxial configuration. This embodiment is most suitable for precision analog or high quality audio recording applications.

In this embodiment an endless belt 110 is guided in a closed loop path such that it will be in non-slipping contact with the supply reel pack 216 between belt guide idlers 119 and 112. Upon leaving belt idler 112 the belt 110 is routed through the tensioning mechanism 113,114,115 and 116 such that it is in non-slipping contact with the take-up supply pack 214 between the belt idlers 111 and 118. Analogous to the previously described principles, the belt in this embodiment is moving at a higher velocity between idlers 111 and 118 where the belt is in contact with the take-up reel than between idlers 112 and 119 where the belt is in contact with the supply reel. Elements 113,114,115 and 116 are the same as and function in the same manner as elements 20,21,48 and 22 of FIG. 5. In this manner an effective and precisely adjustable tape tension is also created in this embodiment. For clarity, the actual reel packs have been partially broken away in FIG. 8. In this embodiment the tape 122 which is wound on the supply and take-up reel packs 216 and 214 is driven directly by the external motor capstan 121 with a spring loaded pinch roller 120 backup to provide a non-slipping interface analogous to that described with respect to FIG. 6. The portion of tape 122 between supply and take-up reel packs and in contact with the motor capstan is indicated.

In the description of the embodiments of this invention and the general discussions of this disclosure, reference was made to the use of belts with a modulus of elasticity of 400,000 psi or greater. The use of belts with this modulus is the preferred embodiment because of the particular applications of usage for these embodiments. However, the principle of operation of the tensioning mechanism of this invention is also applicable to belt materials with modulii of elasticity of less than 400,000 psi.

The principle of operation of this tensioning mechanism is based upon energy losses occurring when a hard cylinder (roller) is made to roll under load on an elastomer material that is softer than the material of the hard roller. These energy losses are mainly due to elastic hysteresis losses in the elastomer. Hence, regardless of the magnitude of the modulus of elasticity of the belt material, the modulus of elasticity of the elastomer material must be less than that of the belt material.

The modulus of elasticity of the belt, the modulus of elasticity of the elastomer ring, the thickness of the ring, the magnitude of the ring's outer diameter, the magnitude of the outer diameter of the hard roller, and the magnitude and the rate of deformation of the elastomer material (caused by the force between the rollers) can be selected in a well known manner to yield an optimum tension profile and optimum performance of the tensioning mechanism for each individual implementation or application in a product.

Although the material for the softer roller has been described as elastomeric material, any viscoelastic material can be used to create the rolling friction phenomena. Preferably the viscoelastic material is of a preferred group of elastomers, namely, silicon rubber, which has a uniform modulus of elasticity over a wide temperature range.

Briefly there has been disclosed herein a strip media drive system. The drive system comprises a pair of rotatable strip media packs such as reel packs 30 and 40 of FIG. 5, 61 and 76 of FIG. 6, 210 and 212 of FIG. 7, 214 and 216 of FIG. 8, for reeling the strip media therebetween. An endless belt such as 23 of FIG. 5, 79 of FIG. 6, 90 of FIG. 7, and 110 of FIG. 8 couples the rotation of the media packs together. The belt tensioner is provided for creating a greater tension in the portion of the endless belt leaving than in the portion entering the belt tensioner. The belt tensioner comprises at least first and second rollers such as 21-48 and 22 of FIG. 5, 48-21, 22 of FIG. 6, 94-95, 96 of FIG. 7, and 114-115, 116 of FIG. 8. The first roller has a hard outer periphery and the second roller has an elastomeric outer periphery. The first and second rollers are forced together on opposite sides of the endless belt so that as the belt is drawn therebetween, rolling friction between the rollers creates a higher tension in the portion of the belt leaving the tensioner.

Although the belt tensioner of FIG. 3 including the resilient middle roller and the two hard outer rollers has been disclosed in the embodiment of the invention depicted in FIGS. 5, 6, 7 and 8, it will be understood that the tape tensioner of FIG. 4 may be substituted in place thereof so as to provide a hard middle roller and two elastomeric outer rollers. It will also be understood that with certain degradation in the reversible performance characteristics that the two-roller arrangement of FIG. 2 may be employed in the embodiments of FIGS. 5, 6, 7 and 8 by removing one of the two outer rollers and other appropriate changes in tensioning and system components.

Although an exemplary embodiment of the invention has been disclosed for purposes of illustration it will be understood that various changes, modifications and substitutions may be incorporated into such embodiment without departing from the spirit of the invention as defined by the claims appearing hereinafter.

EQUATIONS $$P = \frac{2W}{\pi a}\left[1 - \frac{x^2}{a^2}\right]^{\frac{1}{2}} \quad \text{Equation A}$$

$$\frac{\delta}{R} \int_0^a P\,dx = \frac{\delta}{R} \cdot \frac{2Wa}{3\pi} \quad \text{Equation AA}$$

$$U_1 = \frac{2}{3\pi}\left(\frac{Wa}{R}\right) \quad \text{Equation B}$$

$$a = \frac{2}{\sqrt{\pi}}\left[W \cdot R\left(\frac{1-v^2}{E}\right)\right]^{\frac{1}{2}} \quad \text{Equation BB}$$

$$U_1 = \frac{W^{3/2}}{R^{\frac{1}{2}}}\left[\left(\frac{16}{9\pi^3}\right)\left(\frac{1-v^2}{E}\right)\right]^{\frac{1}{2}} \quad \text{Equation C}$$

What is claimed:

1. A strip media drive system comprising a pair of rotatable strip media packs for reeling the strip media therebetween, an endless belt coupling the rotation of the media packs together and a belt tensioner, the belt tensioner comprising at least first and second rotatable rollers, the first roller comprising a hard outer periphery and the second roller comprising a viscoelastic outer periphery, the first and second rollers being forced together on opposite sides of the endless belt to thereby deform the viscoelastic outer periphery so that as the belt is drawn between the rollers, rolling friction caused by the deformation creates a higher tension in the portion of the belt leaving the tensioner than in the portion entering the tensioner.

2. A strip media drive system comprising a pair of rotatable strip media packs for reeling the strip media therebetween, an endless belt coupling the rotation of the media packs together and a bidirectional belt tensioner, the bidirectional belt tensioner comprising first and second rollers both being of either a first type characterized by a hard outer periphery or a second type characterized by a viscoelastic outer periphery and a third roller being of the opposite type from the first and second rollers, the first and third rollers being forced together on opposite sides of the endless belt and the second and third rollers being forced together on opposite sides of the endless belt to thereby deform said viscoelastic outer periphery so that as the endless belt is drawn in either direction between the rollers, rolling friction caused by the deformation creates a higher tension in the part of the belt leaving the tensioner than in the portion entering the tensioner.

3. A strip media drive according to claim 2 wherein the first and second rollers are of the type having a hard outer periphery and the third roller is of the type having a viscoelastic outer periphery.

4. A strip media drive according to claim 2 wherein the first and second rollers are of the type having a viscoelastic outer periphery and the third roller is of the type having a hard outer periphery.

5. A strip media drive according to claim 2 wherein the second type roller comprises a cylindrical roller and a viscoelastic ring thereon.

6. A strip media drive according to claim 5 wherein the inside of the viscoelastic ring is bonded to the outer periphery of the cylindrical roller.

7. A strip media drive according to claim 2 wherein the rollers are each mounted on substantially frictionless bearings.

8. A strip media drive according to claim 2 wherein the first type roller has a harder outer periphery than the endless belt and the second type roller has a more resilient outer periphery than the endless belt.

9. A strip media drive according to claim 2 comprising means for adjusting the pressure between the first and third rollers and independently adjusting the pressure between the second and third rollers.

10. A strip media drive according to claim 2 wherein the media packs are mounted in substantially a common plane.

11. A strip media drive according to claim 2 wherein the endless belt is in substantially nonslipping contact with each media pack.

12. A strip media drive according to claim 2 wherein the endless belt is in substantially nonslipping contact with each media pack over an arc of at least 75°.

13. A strip media drive according to claim 12 comprising at least two idlers and a rotatable belt capstan guiding the endless belt over such arc of contact of at least 75°.

14. A strip media drive according to claim 13 comprising means for individually spring-loading each of the idlers to thereby pretension the endless belt and maintain the endless belt in non-slipping contact with each of the media packs.

15. A strip media drive according to claim 14 wherein the idlers are positioned along the belt path on opposite sides of the belt tensioner and between the media packs and the belt capstan is positioned along the belt path between the media packs and on the opposite side of the media packs from the belt tensioner.

16. A strip media drive according to claim 14 wherein the belt capstan is positioned so as to allow for engagement with an external motor capstan.

17. A strip media drive according to claim 2 wherein the endless belt is in substantially non-slipping contact with each media pack over an arc of at least 135°.

18. A strip media drive according to claim 17 comprising at least four belt idlers for guiding the endless belt over the arc of contact of at least 135° wherein a first and a second of the belt idlers are positioned along the endless belt path on the opposite side from the belt tensioner and wherein a third and a fourth of the idlers are positioned along the endless belt path on opposite sides of the belt tensioner and between the media packs.

19. A strip media drive according to claim 18 wherein the third and fourth idlers are movable spring-loaded idlers for pretensioning the endless belt to substantially prevent slipping between the endless belt and the media packs.

20. A strip media drive according to claim 19 comprising at least one bidirectional pinch roller for engaging the strip media between the media packs.

21. A strip media drive according to claim 20 comprising means for spring-loading the pinch roller in the direction of the strip media to effect a non-slipping interface between the strip media and an external motor capstan.

22. A strip media drive according to claim 2 wherein the media packs are coaxially mounted for rotation about a substantially common axis.

23. A strip media drive according to claim 22 wherein the endless belt is in substantially non-slipping contact with each media pack over an arc of at least 180°.

24. A strip media drive according to claim 23 comprising at least four belt idlers for guiding the endless belt over the arc of contact of at least 180°.

25. A strip media drive according to claim 24 comprising a bidirectional belt capstan for engaging the endless belt.

26. A strip media drive according to claim 25 wherein the belt capstan directs the endless belt from the plane of one media pack to the plane of the other media pack.

27. A strip media drive according to claim 24 comprising a bidirectional capstan for engaging the strip media between the media packs.

28. A magnetic tape cartridge comprising a tape drive system, the drive system comprising a pair of rotatable magnetic tape packs for reeling the magnetic tape therebetween, an endless belt coupling the rotation of the magnetic tape packs together and a belt tensioner, the belt tensioner comprising at least first and second rotatable rollers, the first roller comprising a hard outer periphery and the second roller comprising a viscoelastic outer periphery, the first and second rollers being forced together on opposite sides of the endless belt to thereby deform the viscoelastic outer periphery so that as the belt is drawn between the rollers, rolling friction caused by the deformation creates a higher tension in the portion of the belt leaving the tensioner than in the portion entering the tensioner.

29. A magnetic tape cartridge comprising a tape drive system, the drive system comprising a pair of rotatable magnetic tape packs for reeling the magnetic tape therebetween, an endless belt coupling the rotation of the media packs together and a bidirectional belt tensioner, the bidirectional belt tensioner comprising first and second rollers both being of either a first type characterized by a hard outer periphery or a second type characterized by a viscoelastic outer periphery and a third roller being of the opposite type from the first and second rollers, the first and third rollers being forced together on opposite sides of the endless belt and the second and third rollers being forced together on opposite sides of the endless belt to thereby deform said viscoelastic outer periphery so that as the endless belt is drawn in either direction between the rollers, rolling friction caused by the deformation creates a higher tension in the part of the belt leaving the tensioner than in the portion entering the tensioner.

30. A tape cartridge according to claim 29 wherein the first and second rollers are of the type having a hard outer periphery and the third roller is of the type having a viscoelastic outer periphery.

31. A tape cartridge according to claim 29 wherein the first and second rollers are of the type having a viscoelastic outer periphery and the third roller is of the type having a hard outer periphery.

32. A tape cartridge according to claim 29 comprising a planar mounting member for the tape drive system.

33. A tape cartridge according to claim 29 wherein the second type roller comprises a cylindrical roller and a viscoelastic ring thereon.

34. A tape cartridge according to claim 33 wherein the inside of the viscoelastic ring is bonded to the outer periphery of the cylindrical roller.

35. A tape cartridge according to claim 29 wherein the rollers are each mounted on substantially frictionless bearings.

36. A tape cartridge according to claim 29 wherein the first type roller has a harder outer periphery than the endless belt and the second type roller has a more resilient outer periphery than the endless belt.

37. A tape cartridge according to claim 29 comprising means for adjusting the pressure between the first and third rollers and independently adjusting the pressure between the second and third rollers.

38. A tape cartridge according to claim 29 wherein the endless belt is in substantially non-slipping contact with each media pack.

39. A tape cartridge according to claim 32 wherein the reel packs are mounted in substantially a common plane on the mounting member.

40. A tape cartridge according to claim 39 wherein the endless belt is in substantially non-slipping contact with each reel pack over an arc of at least 75°.

41. A tape cartridge according to claim 40 comprising at least two idlers mounted on the mounting member and a rotatable belt capstan mounted on the mounting member guiding the endless belt over such arc of contact of at least 75°.

42. A tape cartridge according to claim 41 comprising means for individually spring-loading each of the idlers to thereby pretension the endless belt and maintain the endless belt in non-slipping contact with each of the reel packs.

43. A tape cartridge according to claim 42 wherein the idlers are positioned along the belt path on opposite sides of the belt tensioner and between the magnetic tape packs, and the belt capstan is positioned along the belt path between the reel packs and on the opposite side of the reel packs from the belt tensioner.

44. A tape cartridge according to claim 41 wherein the belt capstan is positioned so as to allow for engagement with an external drive capstan.

45. A tape cartridge according to claim 32 wherein the endless belt is in substantially non-slipping contact with each reel pack over an arc of at least 135°.

46. A tape cartridge according to claim 45 comprising at least four belt idlers mounted on the mounting member for guiding the endless belt over the arc of contact of at least 135° wherein a first and a second of the belt idlers are positioned along the endless belt path on the opposite side from the belt tensioner and wherein a third and a fourth of the idlers are positioned along the endless belt path on opposite sides of the belt tensioner and between the reel packs.

47. A tape cartridge according to claim 46 wherein the third and fourth idlers are movable spring-loaded idlers for pretensioning the endless belt to substantially prevent slipping between the endless belt and the reel packs.

48. A tape cartridge according to claim 47 comprising at least one bidirectional pinch roller mounted on the housing for engaging the tape between the reel packs and an opening in the cartridge providing access for an external motor capstan to the tape adjacent to the bidirectional pinch roller.

49. A tape cartridge according to claim 48 comprising means for spring-loading the bidirectional pinch roller in the direction of the tape to effect a non-slipping interface between the magnetic tape and the external motor capstan.

50. A tape cartridge according to claim 29 wherein the reel packs are coaxially mounted for rotation about a substantially common axis.

51. A tape cartridge according to claim 50 wherein the endless belt is in substantially non-slipping contact with each reel pack over an arc of at least 180°.

52. A tape cartridge according to claim 51 comprising at least four belt idlers for guiding the endless belt over such arc of contact of at least 180°.

53. A tape cartridge according to claim 52 comprising a bidirectional belt capstan for engaging the endless belt.

54. A tape cartridge according to claim 52 comprising a further idler for directing the endless belt from the plane of one reel pack to the plane of the other reel pack.

55. A tape cartridge according to claim 52 comprising a bidirectional capstan for engaging the tape between the reel packs.

* * * * *

UNITED STATES PATENT OFFICE
CERTIFICATE OF CORRECTION

PATENT NO. : 4,242,709
DATED : Dec. 30, 1980
INVENTOR(S) : Klaus F. Stricker

It is certified that error appears in the above-identified patent and that said Letters Patent are hereby corrected as shown below:

Column 6, line 41 "would" should be -- wound --;

Column 8, line 4 "68" should be -- 69 --;

Column 8, line 16 "12" should be -- 212 --.

Signed and Sealed this

Fourteenth Day of April 1981

[SEAL]

Attest:

RENE D. TEGTMEYER

Attesting Officer     Acting Commissioner of Patents and Trademarks